(12) United States Patent
Connell et al.

(10) Patent No.: US 8,141,377 B2
(45) Date of Patent: Mar. 27, 2012

(54) TRUCK ELECTRIFIED ENGINE-OFF AIR CONDITIONING SYSTEM

(75) Inventors: Brett Sean Connell, Winnebago, IL (US); Christophe Barreau, Rockford, IL (US); Terry A. Zeigler, Byron, IL (US)

(73) Assignee: Bergstrom, Inc., Rockford, IL (US)

( * ) Notice: Subject to any disclaimer, the term of this patent is extended or adjusted under 35 U.S.C. 154(b) by 886 days.

(21) Appl. No.: 11/677,217

(22) Filed: Feb. 21, 2007

(65) Prior Publication Data

US 2008/0196436 A1    Aug. 21, 2008

(51) Int. Cl.
*B60H 1/32* (2006.01)

(52) U.S. Cl. ............................. 62/239; 62/244

(58) Field of Classification Search ............ 62/239–244, 62/428–429; 165/122, 41, 43
See application file for complete search history.

(56) References Cited

U.S. PATENT DOCUMENTS

| | | | |
|---|---|---|---|
| 3,200,609 A * | 8/1965 | Laing | 62/280 |
| 3,315,488 A | 4/1967 | Lind | |
| 3,351,131 A * | 11/1967 | Berthold | 165/159 |
| 3,366,169 A * | 1/1968 | Laing | 165/48.1 |
| 3,590,910 A | 7/1971 | Lorenz | |
| 3,627,030 A | 12/1971 | Lorenz | |
| 3,844,130 A | 10/1974 | Wahnish | |
| 3,882,925 A * | 5/1975 | Huber | 165/110 |
| 3,995,443 A | 12/1976 | Iversen | |
| 4,015,182 A | 3/1977 | Erdman | |
| 4,324,286 A | 4/1982 | Brett | |
| 4,359,875 A | 11/1982 | Ohtani | |
| 4,459,519 A | 7/1984 | Erdman | |
| 4,577,679 A | 3/1986 | Hibshman | |
| 4,604,036 A | 8/1986 | Sutou et al. | |
| 4,641,502 A * | 2/1987 | Aldrich et al. | 62/244 |
| 4,658,593 A | 4/1987 | Stenvinkel | |

(Continued)

FOREIGN PATENT DOCUMENTS

DE    33 18708 A1    11/1984

(Continued)

OTHER PUBLICATIONS

Michael Löhle, Günther Feuerecker and Ulrich Salzer; NON Idling HVAC-module for Long Distance Trucks; SAE Technical Paper Series 1999-01-1193; International Congress and Exposition, Detroit, Michigan; Mar. 1-4, 1999; 8 pages.

(Continued)

*Primary Examiner* — Mohammad Ali
(74) *Attorney, Agent, or Firm* — Reinhart Boerner Van Deuren P.C.

(57) ABSTRACT

An air conditioning system for cooling an environment in an over-the-road vehicle is provided. The air conditioning system includes an electrically driven, variable speed compressor, which enables operation of the system when the engine of the over-the-road vehicle is not running. The system is modular and is adapted to be installed in the side luggage compartment of the vehicle to enable existing vehicles to be retrofitted to provide no-idle air conditioning. The housing of the system defines two flow paths therethrough; one cold air path and one hot air path. The hot air path is configured to intersect the condenser at least two times, and draws and expels the air through the same wall of the housing. An air direction device is used to reduce the amount of air recirculation through the hot air path to increase the efficiency of the system.

19 Claims, 5 Drawing Sheets

U.S. PATENT DOCUMENTS

| | | | |
|---|---|---|---|
| 4,667,480 A | 5/1987 | Bessler | |
| 4,694,798 A | 9/1987 | Kato et al. | |
| 4,856,078 A | 8/1989 | Konopka | |
| 4,976,115 A * | 12/1990 | Hogan | 62/428 |
| 5,025,634 A | 6/1991 | Dressler | |
| 5,067,652 A | 11/1991 | Enander | |
| 5,170,639 A | 12/1992 | Datta | |
| 5,184,474 A * | 2/1993 | Ferdows | 62/244 |
| 5,275,012 A | 1/1994 | Dage et al. | |
| 5,316,074 A | 5/1994 | Isaji et al. | |
| 5,361,593 A | 11/1994 | Dauvergne | |
| 5,376,866 A | 12/1994 | Erdman | |
| 5,396,779 A | 3/1995 | Voss | |
| 5,465,589 A | 11/1995 | Bender et al. | |
| 5,497,941 A | 3/1996 | Numazawa et al. | |
| 5,501,267 A | 3/1996 | Iritani et al. | |
| 5,502,365 A | 3/1996 | Nanbu et al. | |
| 5,524,442 A | 6/1996 | Bergmen, Jr. et al. | |
| 5,528,901 A | 6/1996 | Willis | |
| 5,535,094 A * | 7/1996 | Nelson et al. | 361/697 |
| 5,562,538 A | 10/1996 | Suyama | |
| 5,586,613 A | 12/1996 | Ehsani | |
| 5,657,638 A | 8/1997 | Erdman et al. | |
| 5,682,757 A | 11/1997 | Peterson | |
| 5,782,610 A | 7/1998 | Ikeda | |
| 5,819,549 A | 10/1998 | Sherwood | |
| 5,878,592 A * | 3/1999 | Borges et al. | 62/285 |
| 5,898,995 A | 5/1999 | Ghodbane | |
| 5,899,081 A | 5/1999 | Evans et al. | |
| 5,901,572 A | 5/1999 | Peiffer et al. | |
| 5,901,780 A | 5/1999 | Zeigler et al. | |
| 5,921,092 A | 7/1999 | Behr et al. | |
| 5,934,089 A | 8/1999 | Nakagawa et al. | |
| 6,016,662 A | 1/2000 | Tanaka et al. | |
| 6,028,406 A | 2/2000 | Birk | |
| 6,038,877 A | 3/2000 | Peiffer et al. | |
| 6,059,016 A | 5/2000 | Rafalovich et al. | |
| 6,112,535 A | 9/2000 | Hollenbeck | |
| 6,134,901 A | 10/2000 | Harvest et al. | |
| 6,152,217 A | 11/2000 | Ito et al. | |
| 6,205,795 B1 | 3/2001 | Backman et al. | |
| 6,230,507 B1 | 5/2001 | Ban et al. | |
| 6,253,563 B1 | 7/2001 | Ewert et al. | |
| 6,276,161 B1 | 8/2001 | Peiffer et al. | |
| 6,351,957 B2 | 3/2002 | Hara | |
| 6,405,793 B1 | 6/2002 | Ghodbane et al. | |
| 6,411,059 B2 | 6/2002 | Frugier et al. | |
| 6,453,678 B1 | 9/2002 | Sundhar | |
| 6,457,324 B2 | 10/2002 | Zeigler et al. | |
| 6,467,279 B1 | 10/2002 | Backman et al. | |
| 6,530,426 B1 | 3/2003 | Kishita et al. | |
| 6,626,003 B1 | 9/2003 | Kortum et al. | |
| 6,681,588 B2 | 1/2004 | Zeigler | |
| 6,889,762 B2 | 5/2005 | Zeigler et al. | |
| 6,939,114 B2 | 9/2005 | Iwanami et al. | |
| 6,981,544 B2 | 1/2006 | Iwanami et al. | |
| 7,100,388 B2 * | 9/2006 | Kim et al. | 62/259.1 |
| 7,316,119 B2 | 1/2008 | Allen | |
| 7,391,612 B2 * | 6/2008 | Foster et al. | 361/697 |
| 7,430,874 B2 * | 10/2008 | Prince et al. | 62/199 |
| 7,458,225 B2 * | 12/2008 | Park et al. | 62/199 |
| 7,765,824 B2 * | 8/2010 | Wong et al. | 62/239 |
| 2001/0010261 A1 | 8/2001 | Oomura et al. | |
| 2002/0026801 A1 | 3/2002 | Yamashita | |
| 2002/0084769 A1 | 7/2002 | Iritani et al. | |
| 2002/0108384 A1 | 8/2002 | Higashlyama | |
| 2002/0112489 A1 | 8/2002 | Egawa et al. | |
| 2002/0157413 A1 | 10/2002 | Iwanami et al. | |
| 2003/0034147 A1 | 2/2003 | Houck et al. | |
| 2003/0041603 A1 | 3/2003 | Tada et al. | |
| 2003/0106332 A1 | 6/2003 | Okamoto | |
| 2004/0031602 A1 * | 2/2004 | Sugiura | 165/203 |
| 2004/0168449 A1 | 9/2004 | Homan et al. | |
| 2005/0161211 A1 | 7/2005 | Zeigler et al. | |
| 2006/0102333 A1 | 5/2006 | Zeigler et al. | |
| 2006/0151163 A1 | 7/2006 | Zeigler et al. | |
| 2006/0151164 A1 | 7/2006 | Zeigler et al. | |
| 2007/0044491 A1 * | 3/2007 | Prince et al. | 62/239 |
| 2007/0131408 A1 | 6/2007 | Zeigler et al. | |

FOREIGN PATENT DOCUMENTS

| | | |
|---|---|---|
| DE | 3411053 A1 | 10/1985 |
| JP | 5032121 A | 2/1993 |
| JP | 2000108651 A | 4/2000 |
| JP | 2002081823 A | 3/2002 |
| WO | WO 99/61269 | 12/1999 |

OTHER PUBLICATIONS

Mahmoud Ghodbane; On Vehicle Performance of a Secondary Loop A/C System; SAE Technical Paper Series 2000-01-1270; SAE 2000 World Congress, Detroit, Michigan; Mar. 6-9, 2000; 6 pages.

Masami Konaka and Hiroki Matsuo; SAE Technical Paper Series 2000-01-1271; SAE 2000 World Congress, Detroit, Michigan; Mar. 6-9, 2000; 6 pages.

Frank Stodolsky, Linda Gaines, and Anant Vyas; Analysis of Technology Options to Reduce the Fuel Consumption of Idling Trucks; Paper-Center for Transportation Research, Energy Systems Division, Argonne National Laboratory, 9700 South Cass Avenue, Argonee, Illinois 60439; Jun. 2000; 30 pages.

Patricia Gardie and Vincent Goetz; Thermal EnergyStorage System by Solid Absorption for Electric Automobile Heating and Air-Conditioning; Paper; 5 pages.

TropiCool No-idle Heating & Cooling, 110V/12V High-efficiency, Self-contained, Electrified Heating/AC System; ACC Climate Control Brochure, Elkhart, Indiana; 1 page.

TropiCool Power Plus, More comfort. More efficiency. More options.; ACC Climate Control Brochure, Elkhart, Indiana; 3 pages.

Packless Industries, the leader in refrigerant to water coaxial heat exchangers, flexible hoses and sucti . . . ; website—http://www.packless.com/profile.html; date last visited Aug. 9, 2007; 1 page.

FlatPlate Heat Exchangers; GEA FlatPlate Inc.; website—http://www.flatplate.com/profile.htm; date last visited Aug. 9, 2007; 3 pages.

Alfa Laval website http://www.alfalaval.com/ecoreJava/WebObjects/ecoreJava.woa/wa/showNode?siteNodeID=1668&cont...; date last visited May 18, 2007; 1 page.

\* cited by examiner

TRUCK ELECTRIFIED ENGINE-OFF AIR CONDITIONING SYSTEM

FIELD OF THE INVENTION

This invention generally relates to air conditioning systems and, in particular, to vehicle mounted air conditioning systems for over the road trucks.

BACKGROUND OF THE INVENTION

The global economic expansion has stressed the transportation industry's ability to keep up with the shipping demands for raw materials and finished products. Indeed, the demand for qualified tractor-trailer drivers has far outstripped the ability of the industry to recruit and train individuals to fill the demand of the marketplace. As a result, the demand of the transportation industry to utilize the existing personnel and vehicles has resulted in increased time spent on the road and in the vehicles in an attempt to meet the market demands.

In an effort to maintain the safety of the highways, federal regulations governing the amount of time that a driver may spend behind the wheel have been instituted. When such maximum times have been reached, the driver is required to take his vehicle off the road and rest. The number of trucks pulled over at toll plazas, weigh stations, and rest stops illustrates the compliance with such regulations. However, these locations often do not provide a place for the drivers to rest. This necessitates continued occupancy within the vehicle.

In response to the needs of the transportation industry and in recognition of the locations where drivers are forced to rest, over-the-road vehicle manufacturers have continued to increase their emphasis on ergonomic factors in the design and manufacture of their vehicles. Indeed, the interior of a modern over-the-road vehicle contains many features to minimize the stress and fatigue placed on the drivers during the operation of the vehicle. These features include, for example, vibration dampers and lumbar supports in the seats, increased sound insulation, and heating, ventilation, and air conditioning (HVAC) systems that provide a comfortable environment for the driver. To accommodate the required rest periods, and in recognition of the increased usage of driving teams that typically include two individuals, one who drives while the other sleeps, many over-the-road vehicles include a sleeping compartment. This sleeping compartment is also temperature controlled so that any time spent therein provides the occupant with a comfortable and restful experience.

To condition the sleeping compartment, many of the air conditioning systems in over-the-road trucks employ engine-belt driven compressors. While these engine-belt compressors are well-suited to circulate and pump refrigerant through the air conditioning system while the engine in the truck is running, they are not able to operate when the engine is turned off. As a result, the air conditioning system cannot cool the sleeping compartment unless the engine of the over-the-road vehicle is left running. Unfortunately, leaving the engine running simply to provide air conditioning to the cab wastes money and increases the pollution produced over the life of the truck.

To address this problem, some of the newest over-the-road trucks are manufactured with no-idle air conditioning systems. The no-idle air conditioning systems are able to provide cooling and/or heating of the passenger compartment when the engine of the truck is turned off. Such no-idle air conditioning systems may typically use a direct current (DC) motor-driven, variable speed compressor powered by one or more batteries instead of the engine belt. By using a DC motor-driven compressor, the no-idle air conditioning system is able to cool the sleeping compartment even when the engine in the vehicle is turned off. Such a no-idle system is disclosed in U.S. Pat. No. 6,889,762, entitled Vehicle Air Conditioning And Heating System Providing Engine On And Engine Off Operation, and assigned to the assignee of the instant application, the teachings and disclosure of which are incorporated herein in their entireties by reference thereto.

Unfortunately, many newly manufactured over-the-road vehicles, and nearly all existing over-the-road vehicles do not include such a no-idle air conditioning system. As a result, truck operators are often forced to choose between two less than ideal situations while trying to comfortably rest. First, they may choose to continuously run their vehicle's engine, often all night, to provide air conditioning while they rest. This first option greatly increases the cost of operating the over-the-road vehicle and increases the pollution produced by the truck since the engine must remain running, which burns additional fuel, simply to operate the air conditioning system.

Alternatively, the truck operator may choose to turn off the engine and try to rest in a non-temperature controlled environment. If the outside temperature and/or humidity at the location where the vehicle is parked are high, getting sufficient rest is difficult. While this second option does not increase the cost of operating the vehicle since the engine is turned off, the driver may not be able to adequately rest due to the elevated and uncomfortable temperature in the sleeping compartment. Therefore, operational safety of the over-the-road vehicle is potentially reduced.

For those new and existing trucks that do not have a no-idle air conditioning system, installing or retrofitting a no-idle system in the truck can be an arduous task. This is due, in no small part, to the limited amount of space that is available. In addition, if attempts are made to force a no-idle air conditioning system into too small of an area, warm and/or hot air generated by the compressor and the condenser in the system cannot be adequately and sufficiently expelled. As a result, the efficiency of the no-idle air conditioning system is greatly reduced and cooling power mitigated.

Therefore, there exists a need in the art for a vehicle air conditioning system that can efficiently provide conditioning of the interior of the vehicle, whether or not the engine in the vehicle is running, and that can be easily and/or modularly installed in the vehicle. The invention provides such an air conditioning system. These and other advantages of the invention, as well as additional inventive features, will be apparent from the description of the invention provided herein.

BRIEF SUMMARY OF THE INVENTION

In view of the above, the present invention provides a new and improved air conditioning system for use in over-the-road vehicles that overcomes the above described and other problems existing in the art. More particularly, the present invention provides a new and improved air conditioning system that provides no-idle operation and air conditioning of the passenger compartment of the over-the-road vehicle. Even more particularly, the present invention provides a new and improved air conditioning system that provides no-idle operation through a modular design that may be retrofitted to existing vehicles to provide them with the benefits of such a no-idle system. Further, the present invention provides a new and improved air conditioning system that may be retrofitted by installing the system in the side luggage compartment of the over-the-road vehicle.

In one embodiment of the present invention, a modular air conditioning system is provided having a housing with a barrier wall positioned to divide the interior of the housing into two sections. The housing includes a front panel defining a first opening and a second opening between the exterior of the housing and one section of the housing. The system includes a compressor-driven refrigeration system that utilizes a first heat exchanger positioned in one section of the housing and a second heat exchanger positioned in the other section of the housing in proximity to the front panel. A first fan is positioned to provide air movement through a first fluid path defined in the housing through the first section of the housing and intersecting the first heat exchanger. A second fan is positioned in proximity to one of the openings in the front panel to provide air movement through a second fluid path. This second flow path is defined in the housing though the first opening of the front panel, through the second heat exchanger a first time, through the second section of the housing, through the second heat exchanger a second time, and through the second opening.

In a preferred embodiment, the front panel includes a wall separating the two openings. Preferably, the system also includes a plenum attached to the front panel in proximity to one of the openings. In such an embodiment, a fan is positioned in between the plenum and the second heat exchanger. In one preferred embodiment, the compressor-driven refrigeration system includes a variable speed, electrically driven compressor operable when an engine of an over-the-road vehicle is not running. Preferably, the compressor is positioned in the second section of the housing. In another embodiment, the compressor-driven refrigeration system includes a DC motor driven, variable speed compressor operable when an engine of an over-the-road vehicle is not running.

In a further preferred embodiment, the system includes a vent positioned in proximity to the front panel. The vent includes an air intake portion in proximity to a first opening in the front panel and an air outlet portion in proximity to the second opening. Preferably, the air intake portion includes a number of louvers positioned to direct air flow in one direction and the air outlet portion includes a number of louvers positioned to direct air flow in another direction. In a highly preferred embodiment, the louvers are positioned to reduce air recirculation therebetween.

In an alternate embodiment of the present invention, an electrified engine off air conditioning system is provided for installation in a side luggage compartment of an over-the-road vehicle. The system includes a housing that defines a first fluid path and a second fluid path. The housing has a first opening and a second opening that define a start and an end to the second fluid path. Also included is a refrigeration system, which utilizes an electric motor driven compressor. The first heat exchanger of the refrigeration system is positioned in the housing such that the first fluid path intersects it at least once. The second heat exchanger of the refrigeration system is positioned in the housing such that the second fluid path intersects it at least twice. Preferably, the system also includes a vent positioned in close proximity to the front panel of the housing. This vent is configured to reduce recirculation of air through the second fluid path.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
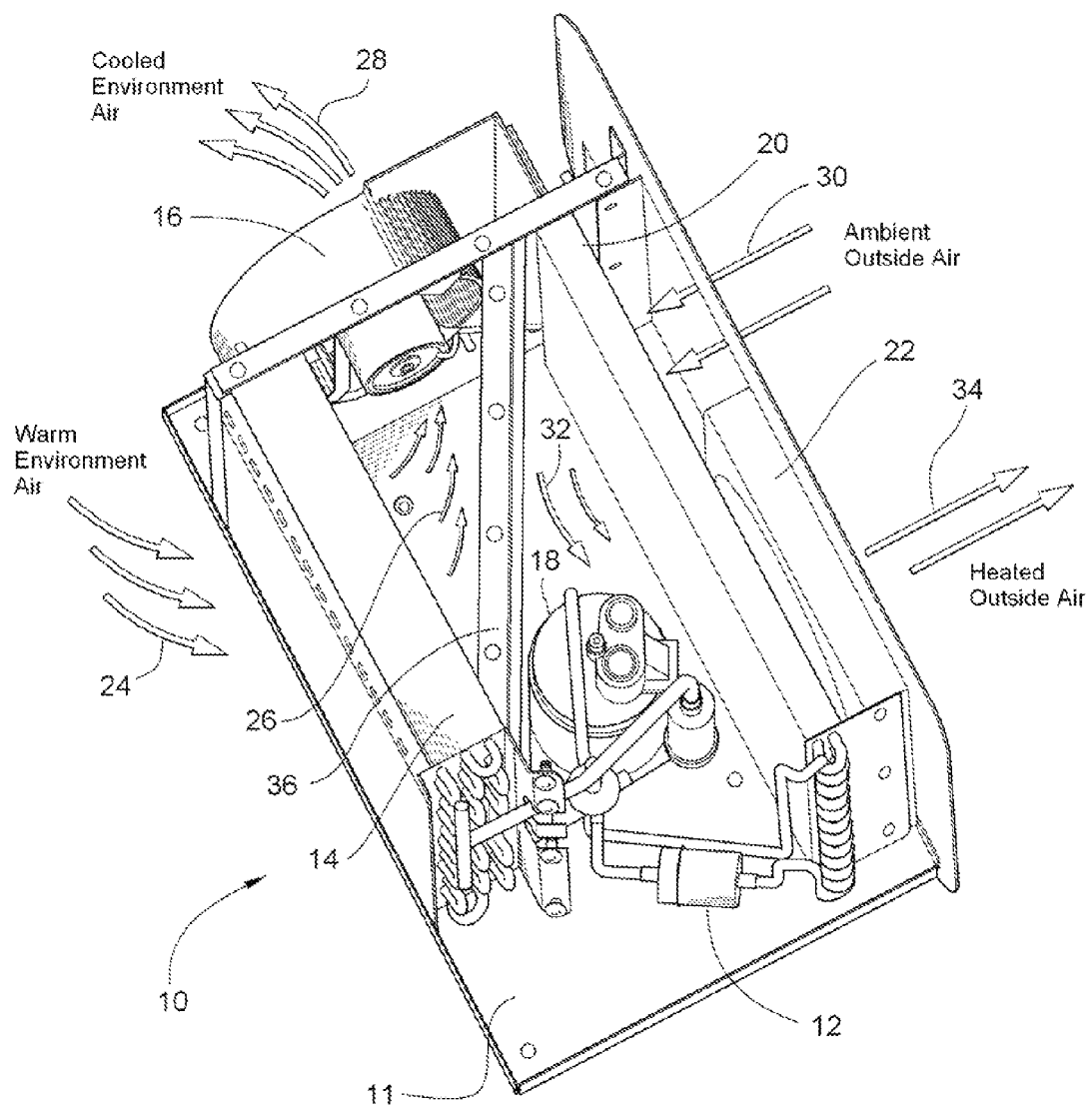
FIG. 1 is a top and generally back perspective view of an exemplary embodiment of an air conditioning system constructed in accordance with the teachings of the present invention.

Referring to FIG. 1, an air conditioning system 10 constructed in accordance with one embodiment of the present invention is illustrated. The air conditioning system 10 of the present embodiment is preferably modular to allow installation in an over the road truck, particularly as an aftermarket retrofit application as will be discussed more fully below. However, as will be recognized from the following by those skilled in the art, the system 10 of the present invention may also be included as an original equipment manufacturer (OEM) component of the over the road vehicle.

The system 10 includes a housing 11 in which is housed a compressor driven air conditioning system. Such a system may include an expansion valve 12, an evaporator 14, a first air movement device 16, a compressor 18, a condenser 20, and a second air movement device 22. Preferably, the compressor 18 is a variable speed, electrically driven compressor. In an exemplary embodiment, the compressor 18 is a variable speed direct current motor-driven compressor. As such, the air conditioning system 10 is well equipped to operate as a no-idle air conditioning system operable when the engine of the vehicle is not running.

The expansion valve 12, the evaporator 14, the compressor 18, and the condenser 20 are operably coupled by, for example, tubing or suction line. In one embodiment they are coupled by permanent tubing having permanent connections to form a self contained modular air conditioning system. The system 10 may also include a reversing valve or other means to allow the refrigeration system to operate as a heat pump if interior heating is also desired through the use of the system 10.

The first air movement device 16 is disposed proximate to and in fluid communication with the evaporator 14 and is configured to move and/or draw air from the passenger compartment of the vehicle to be cooled, through the evaporator 14 and back to the passenger compartment. As shown in FIG. 1, the path of the air through the evaporator 14 and the first air movement device 16 is depicted by arrows 24 directed from the passenger compartment toward the evaporator, arrows 26 within the air conditioning system 10, and arrows 28 directed out of the first air movement device 16 to the passenger compartment to be cooled. In a preferred embodiment, the first air movement device 16 is a fan such as, for example, an centrifugal fan (i.e., an impeller type fan). A barrier 36 separates the housing 11 and directs the air (see arrows 26) through the housing 11 to the fan 16.

The second air movement device 22 is disposed proximate the condenser 20 and is configured to move and/or draw air through the condenser 20 to remove heat therefrom. In a preferred embodiment, the second air movement device 22 is a fan such as, for example, an axial-flow fan. As shown in FIG. 1, the path of the air through the condenser 20 and the second air movement device 22 is depicted by arrows 30 directed toward the condenser, arrows 32 within the air conditioning system 10, and arrows 34 directed out of second air movement device 22. As shown, the second air movement device 22 causes the air to pass through the condenser 20 at least twice during circulation. By forcing the air to make multiple passes through the condenser 20, the dissipation of heat is improved and the overall efficiency of the air conditioning system 10 is increased. Such multiple pass air flow enables the system 10 of the present invention to be installed in various locations on the over the road vehicle that may not have a large volume of airflow therethrough as will be described more fully below.

Still referring to FIG. 1 and as introduced above, housing 11 of the air conditioning system 10 further includes a barrier 36 generally separating the evaporator 14 from the condenser 20, or the cold side of the system 10 from the hot side. In other words, the barrier 36 or wall generally divides the housing 11 of the air conditioning system 10 into compartments and inhibits and/or prevents the cooled air from mixing with the warm air. In addition to dividing the air conditioning system 10, as shown in FIG. 1, the barrier 36 is also positioned to direct and/or guide both the air that is being cooled (represented by arrows 24, 26, 28) and the air that is removing heat from the condenser 20 (represented by arrows 30, 32, 34) through the housing 11.

Figure 2:
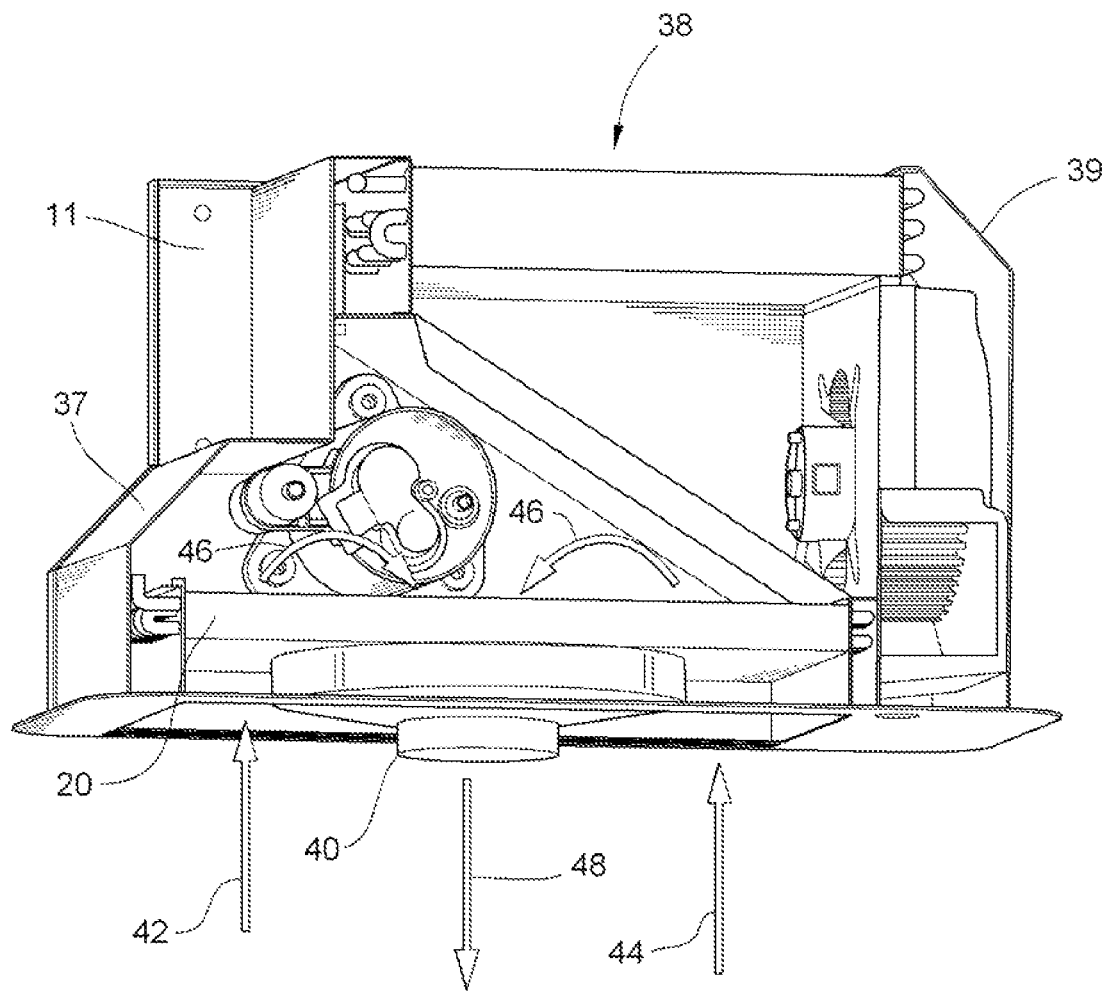
FIG. 2 is a top perspective view of an alternative embodiment of an air conditioning system constructed in accordance with the teachings of the present invention.

Referring now to FIG. 2, an alternate embodiment of an air conditioning system 38 is illustrated. In this embodiment, the second fan 40 is positioned such that air to cool the condenser 20 is permitted to flow into the air conditioning system 38 in two spaced apart locations on either side of the condenser 20, as shown by arrows 42, 44. The air circulates within the housing 11 as shown by arrows 46, and then exits the air conditioning system at a single location through the fan 40, as shown by arrow 48. As with the previous embodiment illustrated in FIG. 1, the multiple passes of the air through the condenser 20 improves the removal of heat therefrom and improves the efficiency of the system 10.

FIG. 2 also illustrates enclosure walls 37, 39, which were not illustrated in FIG. 1 so that other components could be viewed in that particular orientation. These enclosure walls 37, 39 of the housing 11 complete the separation between the hot and cold areas of the system 10 and ensure that proper air flow through the housing 11 is maintained without improper mixing thereof. This also helps increase the efficiency of the system 10.

Figure 3:
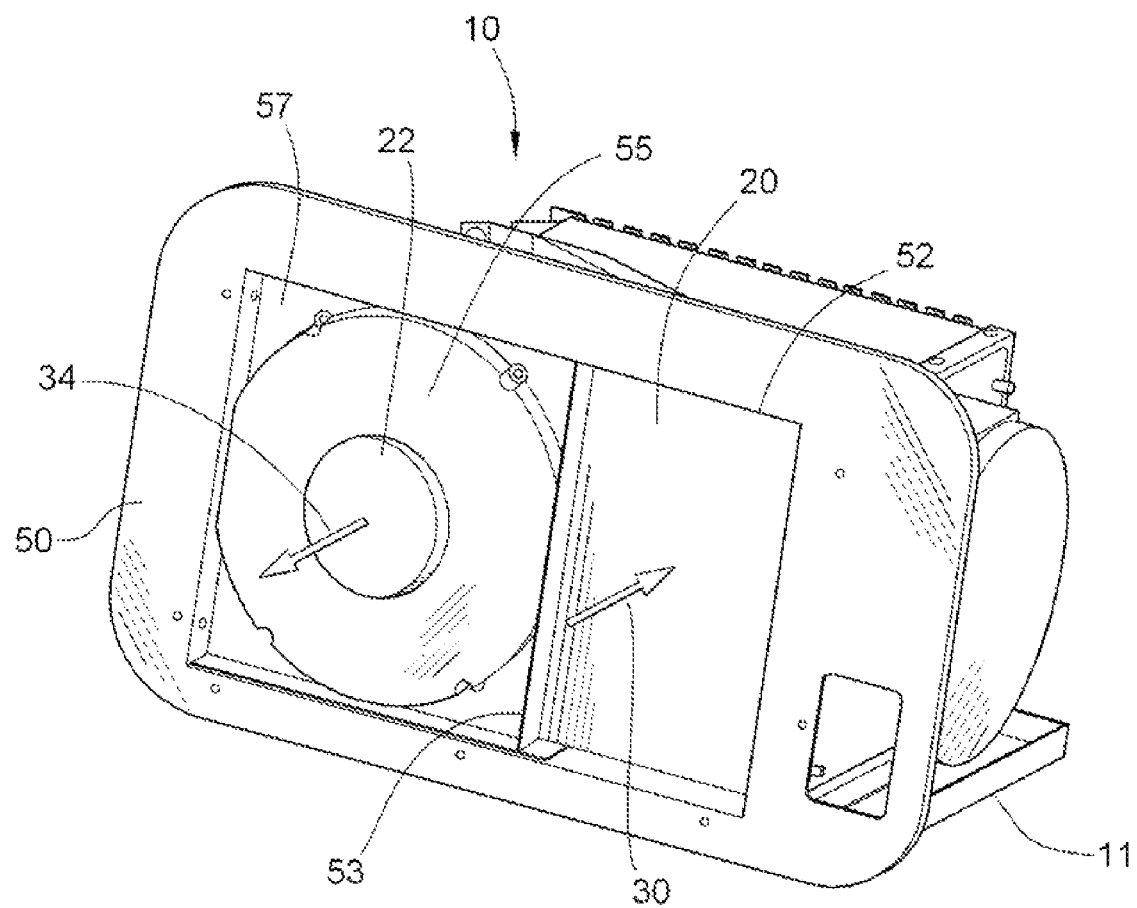
FIG. 3 is a front perspective view of the air conditioning system of FIG. 1.

Turing now to FIG. 3, which provides a front perspective view of the embodiment of the present invention illustrated introduced in FIG. 1, the front panel 50 of the housing 11 of the air conditioning device 10 may be seen more clearly. As may be seen, the front panel 50 is configured to ensure that air is drawn into the housing 11 by the fan 22 through an exposed portion of the condenser 20 via an opening 52 in the front panel 50. In this embodiment, the opening 52 is placed laterally from the placement of the fan 22, and is separated via a wall 53 from the area of fan 22 placement. The area 57 of the front panel 50 where the fan 22 is located is closed so that no air can flow into or out of the condenser in proximity thereto, other than through the fan 22. To increase the surface area of the condenser 20 from which air is drawn by fan 22, the area 57 of the front panel 50 includes a large aperture over which is secured a plenum 55 which houses the fan 22.

As noted above, as the fan 22 operates the air flows into housing 11 through the opening 52 in the front panel 50 and across the condenser 20 as shown by arrow 30. The air then circulates through the housing 11 (see FIG. 1, arrows 32) and again across the condenser 20, before being expelled of the housing 11, as shown by arrow 34, through the plenum 55 via fan 22. This configuration ensures that, despite the close proximity of these two air flow paths, the air will not circulate only in the immediate area of the front panel 50 of the housing 11, which would reduce the efficiency of the system 10.

Figure 4:
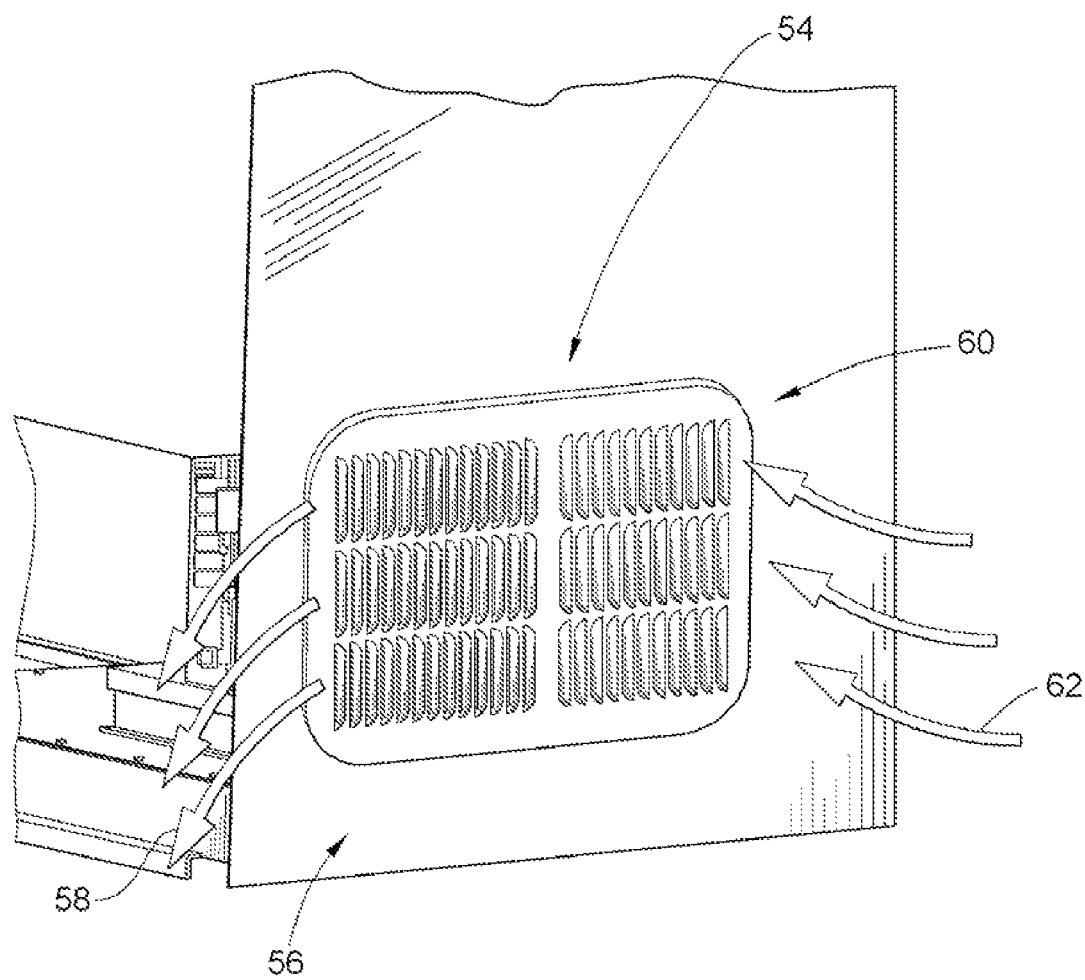
FIG. 4 is a front and side perspective view of an air direction device employed with the air conditioning system of FIG. 1.

To further aid the air flow and inhibit the undesirable recirculation of air around the front of the housing 11 as discussed above, the air direction device or vent 54 illustrated in FIG. 4 may be used. This vent 54 is positioned in proximity to the front panel 50, preferably such that it is disposed over at least a portion of both the opening 52 and the fan 22. The vent 54 is designed to reduce the likelihood of air recirculation, i.e. circulation of the air in only the immediate area of the front panel 50, which could reduce the efficiency of the system 10. In the illustrated embodiment of FIG. 4, the vent 54 includes an air intake portion 56 and an air outlet portion 60. Each of these portions 54, 60 include louvers that have their opening directed away from the openings of the louvers from the other section. In this way, the air is drawn into the housing 11 from a first direction, as shown by arrow 62. The air is then expelled through the air outlet portion so that it is directed away from the air intake portion 54 as shown by arrow 58.

Figure 5:
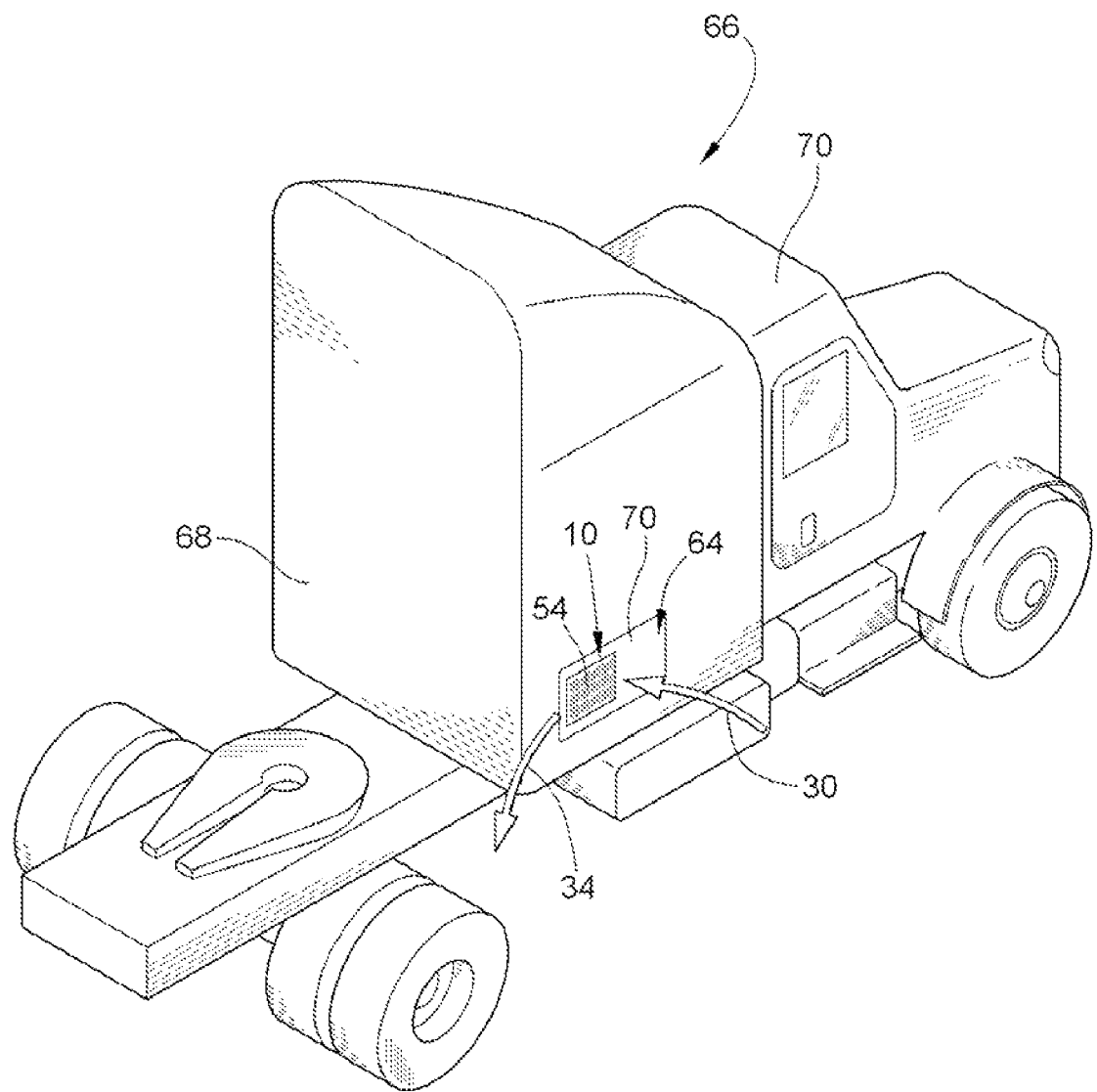
FIG. 5 is a top and back perspective view of an over-the-road vehicle having the air conditioning system of FIG. 1 installed therein.

As introduced above, an embodiment of the present invention is particularly well suited to be installed in an over the road vehicle as an aftermarket system to provide no-idle air conditioning on existing vehicles. In one such embodiment, the system 10 may be installed in, for example, the side luggage compartment 64 of the over-the-road vehicle 66 as illustrated in FIG. 5. The side luggage compartment provides, or can be quickly and easily altered to provide, access to the sleeper compartment 68 and/or cab 70 of the vehicle 66, as well as the environment outside the over-the-road vehicle 66, i.e. the outside air.

In such an installation, which is enabled by the compact modular design configuration in this embodiment, the air conditioning system 10 is installed in the compartment 64 of the over-the-road vehicle 66 such that the front panel 50 (see FIG. 3) is positioned in proximity to the door 70 of the compartment 64. Preferably, the vent 54 is provided in the door 70 to provide the directed air flow into and out of the system 10 within the compartment 64 to provide cooling of the condenser and efficient operation of the system 10. Ducts (not shown) are used to provide the air circulation from the interior of the over the road vehicle 66, through the evaporator of the system 10, and back to the interior.

In an alternate embodiment, the front panel 50 of the housing 11 of the air conditioning system 10 is sized and dimensioned to replace the door 70 of the compartment 64. In such an embodiment, the door 70 is removed and the air conditioning system 10 is fitted into and secured within the open compartment 64. Preferably, the vent 54 is mounted over the front panel 50 to provide increased efficiency operation of the system 10 as discussed above.

In this modular installation arrangement, the air conditioning device 10 is able to cool the sleeper compartment 68 and/or the cab 70 without having to run the engine of the vehicle. The system 10 also draws from and vents air into the outside environment in a manner that prevents recirculation, as shown by arrows 30 and 34, to increase the operating efficiency of the system. This reduces the energy draw and extends the operating life of the system due at least in part to the multiple paths of air flowing through the condenser 20.

Specifically, the first fan 16 draws air from within the sleeper compartment 68 and/or cab 70 environment and flows that air through the evaporator 14 to cool and dehumidify the air. The chilled, dehumidified air then flows into the sleeper compartment 68 and/or cab 70 until that environment is at a comfortable temperature. In that regard, the air conditioning system 10 can be thermostatically controlled. The system 10 may also be controlled as described in commonly assigned U.S. Pat. No. 6,889,762, entitled Vehicle Air Conditioning and Heating System Providing Engine On and Engine Off Operation, the teachings and disclosure of which are hereby incorporated in their entireties by reference thereto.

On the other side of the air conditioning system 10, the second fan 22 draws air from the outside environment and flows that air through the condenser 20 at least twice to dissipate heat from the condenser 20. The heated air is then exhausted to the outside environment. To ensure that recirculation is reduced to allow the air conditioning device to operate at increased efficiently, the vent 54 may be used. As discussed above, the vent 54 causes the air to be pulled into, and exhausted away from, the condenser 20 in a direction that does not air recirculation.

From the foregoing, those skilled in the art will recognize that the invention provides a vehicle air conditioning system that can be easily and/or modularly installed in the vehicle and that can efficiently provide conditioning of the interior of the vehicle, not only during periods of engine operation, but also during engine off or no-idle conditions.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A modular air conditioning system, comprising:
a housing having a barrier wall positioned therein to divide an interior of the housing into a first section and a second section, the housing including a front panel defining a first opening and a second opening therethrough to provide fluid communication between an exterior of the housing and the second section of the housing;
a compressor-driven refrigeration system including a first heat exchanger positioned in the first section of the housing and a second heat exchanger positioned in the second section of the housing in proximity to the front panel;
a first air movement device positioned to provide air movement through a first fluid path defined in the housing through the first section of the housing and intersecting the first heat exchanger;
a second air movement device positioned in proximity to the second opening in the front panel to provide air movement through a second fluid path defined in the housing through the first opening of the front panel, through the second heat exchanger a first time, through the second section of the housing, through the second heat exchanger a second time, and through the second opening; and
wherein the compressor-driven refrigeration system includes a variable speed, electrical driven compressor operable when an engine of an over-the-road vehicle is not running.

2. The system of claim 1, wherein the front panel includes a wall separating the first opening from the second opening.

3. The system of claim 1, further comprising a plenum attached to the front panel in proximity to the second opening therethrough.

4. The system of claim 3, wherein the second air movement device is positioned in proximity between the plenum and the second heat exchanger.
wherein the compressor-driven refrigeration system includes a variable speed, electrically driven compressor operable when an engine of an over-the-road vehicle is not running 5. The system of claim 1, wherein the compressor is positioned in the second section of the housing.

6. A modular air conditioning system, comprising:
a housing having a barrier wall positioned therein to divide an interior of the housing into a first section and a second section, the housing including a front panel defining a first opening and a second opening therethrough to provide fluid communication between an exterior of the housing and the second section of the housing;
a compressor-driven refrigeration system including a first heat exchanger positioned in the first section of the housing and a second heat exchanger positioned in the second section of the housing in proximity to the front panel;
a first air movement device positioned to provide air movement through a first fluid path defined in the housing through the first section of the housing and intersecting the first heat exchanger;
a second air movement device positioned in proximity to the second opening in the front panel to provide air movement through a second fluid path defined in the housing through the first opening of the front panel, through the second heat exchanger a first time, through the second section of the housing, through the second heat exchanger a second time, and through the second opening; and wherein the compressor-driven refrigeration system includes a DC motor driven, variable speed compressor operable when an engine of an over-the-road vehicle is not running.

7. The system of claim 6, further comprising a vent positioned in proximity to the front panel, the vent including an air intake portion in proximity to the first opening in the front panel and an air outlet portion in proximity to the second opening.

8. The system of claim 7, wherein the air intake portion includes a first plurality of louvers positioned to direct air flow in a first direction and wherein the air outlet portion includes a second plurality of louvers positioned to direct air flow in a second direction.

9. The system of claim 7, wherein the air intake portion includes a first plurality of louvers, wherein the air outlet portion includes a second plurality of louvers, and wherein the first and the second plurality of louvers are positioned to reduce air recirculation therebetween.

10. A modular air conditioning system, comprising:
a housing having a barrier wall positioned therein to divide an interior of the housing into a first section and a second section, the housing including a front panel defining a first opening and a second opening therethrough to provide fluid communication between an exterior of the housing and the second section of the housing;
a compressor-driven refrigeration system including a first heat exchanger positioned in the first section of the housing and a second heat exchanger positioned in the second section of the housing in proximity to the front panel;
a first air movement device positioned to provide air movement through a first fluid path defined in the housing through the first section of the housing and intersecting the first heat exchanger;
a second air movement device positioned in proximity to the second opening in the front panel to provide air movement through a second fluid path defined in the housing through the first opening of the front panel, through the second heat exchanger a first time, through the second section of the housing, through the second heat exchanger a second time, and through the second opening; and
wherein the first air movement device is a centrifugal fan.

11. A modular air conditioning system, comprising:
a housing having a barrier wall positioned therein to divide an interior of the housing into a first section and a second section, the housing including a front panel defining a first opening and a second opening therethrough to provide fluid communication between an exterior of the housing and the second section of the housing;
a compressor-driven refrigeration system including a first heat exchanger positioned in the first section of the housing and a second heat exchanger positioned in the second section of the housing in proximity to the front panel;
a first air movement device positioned to provide air movement through a first fluid path defined in the housing through the first section of the housing and intersecting the first heat exchanger;
a second air movement device positioned in proximity to the second opening in the front panel to provide air movement through a second fluid path defined in the housing through the first opening of the front panel, through the second heat exchanger a first time, through the second section of the housing, through the second heat exchanger a second time, and through the second opening; and
wherein the second air movement device is an axial-flow fan.

12. A modular air conditioning system, comprising:
a housing having a barrier wall positioned therein to divide an interior of the housing into a first section and a second section, the housing including a front panel defining a first opening and a second opening therethrough to provide fluid communication between an exterior of the housing and the second section of the housing;
a compressor-driven refrigeration system including a first heat exchanger positioned in the first section of the housing and a second heat exchanger positioned in the second section of the housing in proximity to the front panel;
a first air movement device positioned to provide air movement through a first fluid path defined in the housing through the first section of the housing and intersecting the first heat exchanger;
a second air movement device positioned in proximity to the second opening in the front panel to provide air movement through a second fluid path defined in the housing through the first opening of the front panel, through the second heat exchanger a first time, through the second section of the housing, through the second heat exchanger a second time, and through the second opening; and
wherein the housing is adapted to mount in a luggage compartment of an over-the-road vehicle.

13. The system of claim 12, wherein the front panel is adapted to replace a luggage compartment door of the over-the-road vehicle.

14. An electrified engine off air conditioning system, comprising:
a housing adapted for installation in a side luggage compartment of an over-the-road vehicle defining a first fluid path and a second fluid path therethrough, the housing including a first opening and a second opening defining a start and an end to the second fluid path;
a refrigeration system including an electric motor driven compressor, a first heat exchanger positioned in the housing such that the first fluid path intersects the first heat exchanger at least once and a second heat exchanger positioned in the housing such that the second fluid path intersects the second heat exchanger at least twice.

15. The system of claim 14, wherein the first opening and the second opening are positioned through a front panel of the housing.

16. The system of claim 15, wherein the second heat exchanger is positioned in close proximity to the front panel such that the second fluid path intersects the second heat exchanger at the first opening and at the second opening.

17. The system of claim 15, further comprising a vent positioned in close proximity to the front panel, the vent configured to reduce recirculation of air from the second opening to the first opening.

18. The system of claim 14, further comprising a first fan positioned in fluid communication with the first fluid path and a second fan positioned in fluid communication with the second fluid path.

19. The system of claim 14, wherein the second heat exchanger is a condenser.

* * * * *

UNITED STATES PATENT AND TRADEMARK OFFICE
CERTIFICATE OF CORRECTION

| | | |
|---|---|---|
| PATENT NO. | : 8,141,377 B2 | |
| APPLICATION NO. | : 11/677217 | |
| DATED | : March 27, 2012 | |
| INVENTOR(S) | : Brett Sean Connell, Christophe Barreau and Terry A. Zeigler | |

It is certified that error appears in the above-identified patent and that said Letters Patent is hereby corrected as shown below:

Claim 1,
Column 8, Line 34, after "variable speed," delete the word "electrical" and insert the word
--electrically--

Claim 4,
Column 8, Beginning at Line 45 and end at Line 48, after "heat exchanger." delete paragraph
"wherein the compressor-driven refrigeration system includes a variable speed,
electrically driven compressor operable when an engine of an over-the-road
vehicle is not running"

Signed and Sealed this
Fifteenth Day of May, 2012

David J. Kappos
*Director of the United States Patent and Trademark Office*